Nov. 3, 1953     T. R. ROBERTS     2,657,446
SAFETY SNAP HOOK
Filed July 9, 1951
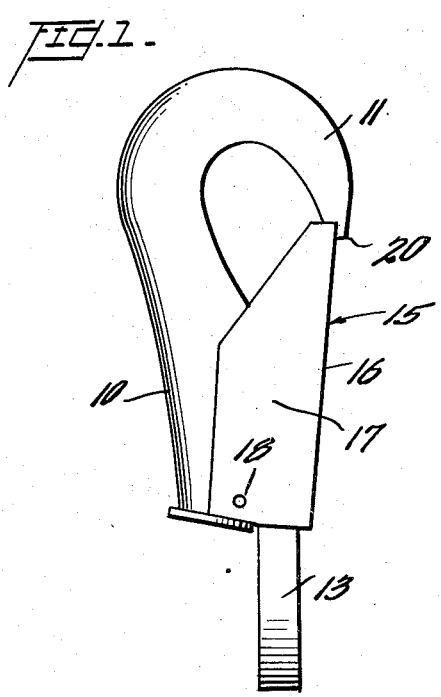
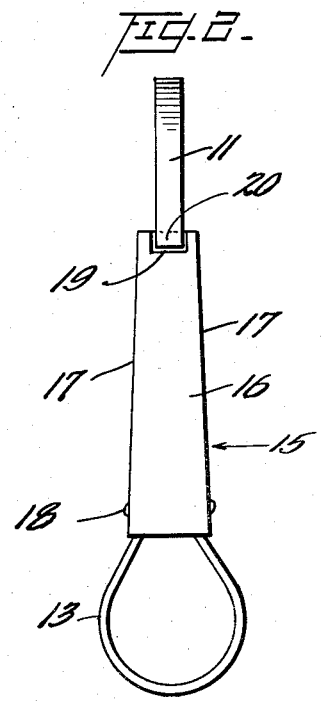
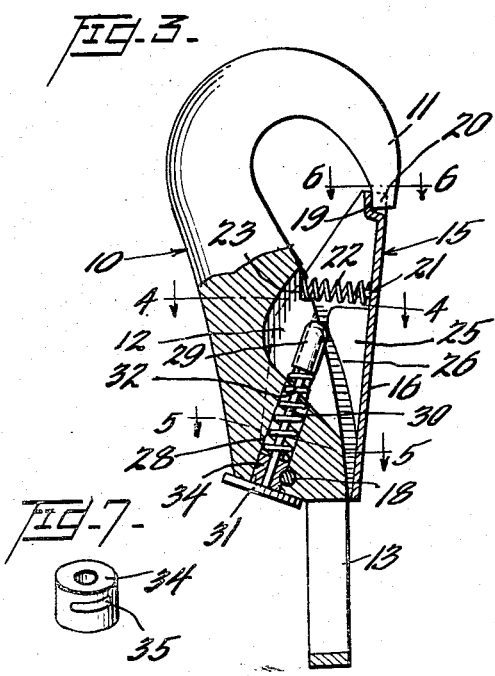
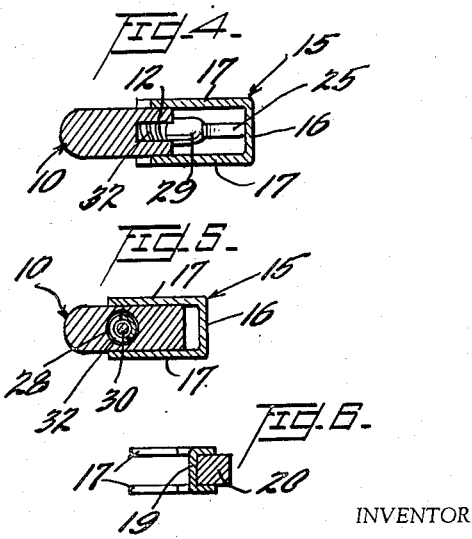
INVENTOR
*Tom R. Roberts,*
BY *Parker and Walsh.*
ATTORNEYS Patented Nov. 3, 1953

2,657,446

UNITED STATES PATENT OFFICE 2,657,446

SAFETY SNAP HOOK

Tom R. Roberts, Homestead, Fla.

Application July 9, 1951, Serial No. 235,703

3 Claims. (Cl. 24—241)

This invention relates to a safety snap hook, and more particularly to a safety lock for a snap hook guard.

Snap hooks are very widely used, for example as so-called butt hooks in the logging industry, on cables used in hoisting apparatus, etc. These hooks are provided with spring-pressed guards normally to maintain the hooks closed, and because of striking various objects when in use, the guards can be easily pushed to open position accidentally to release the element being held by the hook.

An important object of the present invention is to provide a novel snap hook provided with a guard of novel form having associated therewith means for positively preventing the guard from being moved from its normal locking position.

A further object is to provide a novel form of cam device for maintaining the guard normally in operative position.

A further object is to provide a snap hook having a guard which readily may be formed of stamped sheet steel or the like and which cooperates with other elements of the device to provide relatively smooth external surfaces to minimize the catching of any parts of the hook on any elements which might interfere with its normal use.

A further object is to provide a novel type of spring-pressed device operative in conjunction with a cam carried by the hook guard for normally maintaining the latter in operative position.

A further object is to provide novel and simple means for pivotally connecting the guard to the hook body and for maintaining in position the spring device which normally maintains the guard in operative position.

Other objects and advantages of the present invention will become apparent during the course of the following description.

In the drawing, I have shown one embodiment of the invention. In this showing,

Figure 1 is a side elevational view of the complete hook,

Figure 2 is an end view thereof,

Figure 3 is a sectional view in the plane of the hook body, parts being shown in elevation, Figure 4 is a detailed sectional view on line 4—4 of Figure 3, Figure 5 is a similar view on line 5—5 of Figure 3, Figure 6 is a similar view on line 6—6 of Figure 3 showing a broken section of a portion of the device, and Figure 7 is a detailed perspective view on an enlarged scale showing a novel type of spring seat used with the device.

The device comprises a hook body indicated as a whole by the numeral 10 and having an integral conventional hook element 11. In its inner edge, the hook body 10 is provided with a relatively narrow slot 12 in a plane parallel to the sides of the hook body as shown in Figures 3 and 4. The hook body 10 is provided at the lower end thereof, as viewed in Figures 1, 2 and 3, with an integral eye 13 adapted for connection with a logging chain or any other element.

The hook is provided with a guard indicated as a whole by the numeral 15. This guard may be formed of sheet steel stamped into substantially U-shape as clearly shown in Figures 4 and 5 to provide a base wall 16 and side flanges 17, the latter of which relatively snugly fit against the side faces of the hook body. The side walls or flanges 17 are pivotally connected to the hook body by means of a pin 18 which may be peened over at its ends.

The guard pivots on the pin 18, as will be obvious, and at its free end, the guard is stamped to provide a recess 19 receiving the point 20 of the hook. The inner face of the base wall 16 of the guard is provided with a small pin 21 received in the adjacent end of the spring 22 normally urging the guard to closed position, and the opposite end of this spring is arranged in a recess 23 formed in the hook body. The base wall 16 of the guard is provided with a rib 25 preferably welded thereto and having a curved or inclined inner edge 26 to form a cam for a purpose to be described.

The hook body is provided with an opening 28 drilled angularly as shown in Figure 3 to pass through the solid portion of the base of the hook and through the slot 12, the opening 28 being of substantially greater diameter than the width of the slot 12. A keeper 29, corresponding in diameter to the opening 28 is slidable therein and normally arranged wholly in the portion of the opening 28 which extends through the slot 12. A rod 30 is connected to the keeper 29 and is provided at its lower end as viewed in Figure 3 with a finger piece 31 to retract the keeper against the tension of a spring 32 surrounding the rod or stem 30.

Novel means is employed for simplifying the construction and assembly of the device to utilize the pin 18 as means for retaining in position the spring device just described. Within the opening 28 and adjacent the lower end thereof as viewed in Figure 3 is arranged a thimble 34 through which the stem 30 is slidable. This thimble is provided with a tangential groove 35 as clearly shown in Figure 7. The opening 28 and the opening for the pivot pin 18 intersect to a limited extent, and when the parts are assembled as shown in Figure 3, the groove 35 forms a part of the opening for the pin 18 and the insertion of this pin retains the thimble 34 in position.

Operation

In assembling the device, the spring 22 is placed on the pin 21 and the side walls or flanges 17 are slipped over the body of the hook with the recess 19 receiving the hook point 20. The guard is placed in proper position to receive the pin 18, whereupon the spring device is inserted in the opening 28. In assembling the spring device, the assembler will properly align the groove 35 (Figure 7) with the opening for the pin 18, and when the spring device is inserted fully to the position shown in Figure 3, the pin 18 may be inserted and peened over at its ends to secure it in position. All of the parts will then be permanently assembled by the use of the single pin 18.

When it is desired to connect an element to the hook 11, the keeper 29 is retracted by pulling on the finger piece 31 whereupon the guard 15 may be pressed inwardly against the tension of the spring 22. The guard may be retained in its inner operative position with one finger, and the finger piece 31 may be released. Accordingly, the guard may be held open with one hand while the element to be hooked may be guided into the hook 11 with the other hand. It is then merely necessary to release the guard 16 and the springs 22 and 32 will move the guard to the normal operative position shown. The spring 22 acts directly on the guard to close it, while the spring 32 moves the keeper 29 along the cam edge 26 to move the keeper to closed position. The use of the spring 22 is preferred but not essential since the spring 32 will function to move the keeper to closed position.

The acute angle between the cam edge 26 and the axis of the keeper 29 is such that forces exerted inwardly against the guard 15, accidentally or otherwise, will not force the keeper 29 downwardly. This keeper seats laterally against the portions of the opening 28 drilled through the walls of the slot 12 and the keeper acts as positive means to maintain the guard in closed position. Accordingly, it is impossible for the guard 15 to open or be opened except by first manually retracting the keeper 29 by pulling on the finger piece 31.

All surfaces of the device are relatively smooth to prevent interference with movement of the device, it being substantially impossible for trees, other cable lines or any other elements to catch in the side or upper portions of the hooks. The point 20 of the hook 11 is substantially completely housed in the recess 19 to prevent anything from catching in the hook end 20. The device is simple and highly rugged in construction and is capable of very easy assembly in the manner referred to above. The keeper 29 acts normally as a rigid abutment between the rib 25 and the walls of the opening 28 within the slot 12 directly to transmit thrusts to the hook body when any force is transmitted against the guard 15 tending to open it.

I claim:

1. A snap hook structure comprising a body having a hook portion, a guard pivotally connected to said body and normally extending to the end of said hook to form a closure therefor, a spring device slidably mounted in said body and including a keeper normally engageable with said guard to prevent movement of the latter away from its normal position, said spring device further comprising a spring seat and a spring interposed between said seat and said keeper, and a single pin pivotally connecting said guard to said body and engaging said spring seat to fix the latter in said hook body.

2. A snap hook structure comprising a body having a hook end, a guard of U-shaped cross section having side flanges extending over opposite sides of said body, said guard having said side flanges thereof pivotally connected to said body at the end thereof opposite said hook end and projecting upwardly to a normally closed position with one end adjacent the extremity of said hook end, a narrow longitudinally extending rib carried by said guard between said flanges and provided with a cam edge, said hook body having an opening therethrough adjacent the pivotal connection of said flanges, and a spring device comprising a keeper slidably mounted in said opening and normally engaging said cam edge, a spring engageable at one end with said keeper, a thimble forming a spring seat engaging the other end of said spring, a stem carried by said keeper and projecting through said spring and said thimble, and a finger piece carried by the end of said stem externally of said hook body for the retraction of said keeper.

3. A snap hook structure comprising a body having a hook end, a guard of U-shaped crosssection having side flanges extending over opposite sides of said body, a pivot pin extending through said body and said flanges to pivotally connect said guard to said body, said guard projecting upwardly from said pivotal connection to a normally closed position with its end adjacent the extremity of said hook end, a narrow rib carried by said guard between said flanges and provided with a cam edge, said hook body having an opening, a keeper slidably mounted in said opening for axial sliding movement, a spring urging said keeper in one direction into engagement with said cam edge, a thimble forming a spring seat for said spring and having a transverse groove receiving said pivot pin whereby the latter supports said thimble in said body, a stem carried by said keeper and projecting through said spring and said thimble, and a finger piece carried by the end of said stem externally of said hook body for the retraction of said keeper.

TOM R. ROBERTS.

References Cited in the file of this patent

UNITED STATES PATENTS

| Number | Name | Date |
|---|---|---|
| 158,220 | Reynolds | Dec. 29, 1874 |
| 281,857 | Flagg | July 24, 1883 |
| 659,686 | Mitchell | Oct. 16, 1900 |
| 793,381 | Kortick | June 27, 1905 |
| 1,025,666 | Yeagle | May 7, 1912 |
| 1,161,751 | Sullivan | Nov. 23, 1915 |
| 1,219,942 | Hiatt | Mar. 20, 1917 |
| 1,263,099 | Olson | Apr. 16, 1918 |
| 2,116,880 | Dee | May 10, 1938 |
| 2,166,666 | Rolan | July 18, 1939 |
| 2,197,997 | Dee | Apr. 23, 1940 |
| 2,490,931 | Thompson | Dec. 13, 1949 |

FOREIGN PATENTS

| Number | Country | Date |
|---|---|---|
| 16,783 | Great Britain | of 1911 |